3,513,874
VALVE DEVICE HAVING RESILIENT RESPONSE ELEMENTS

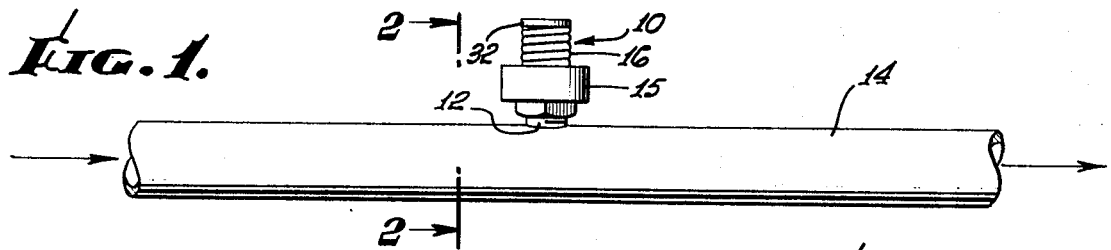
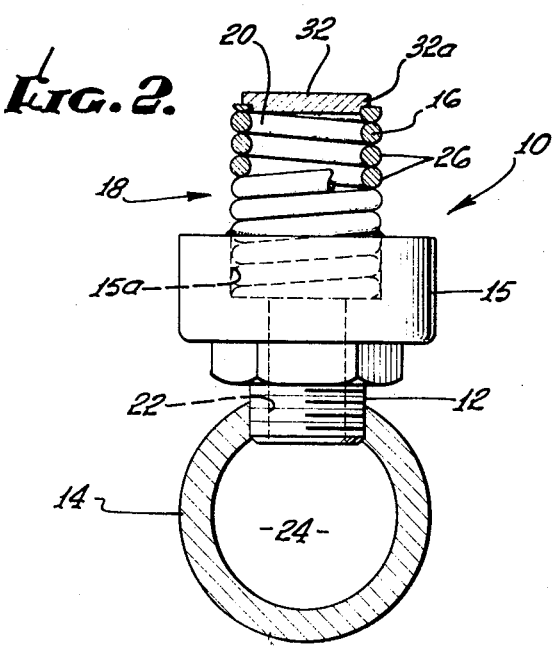
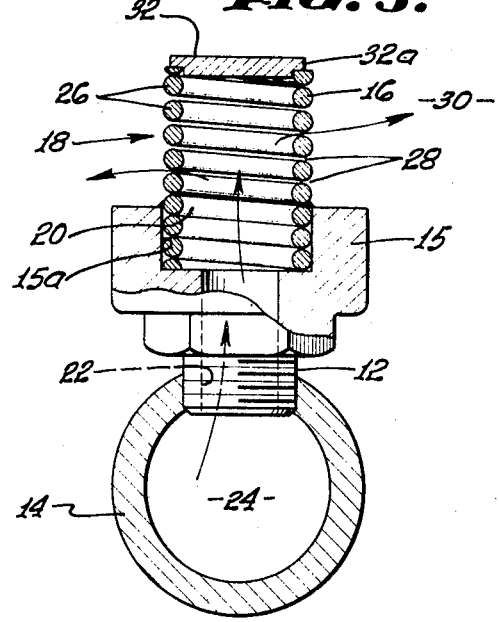
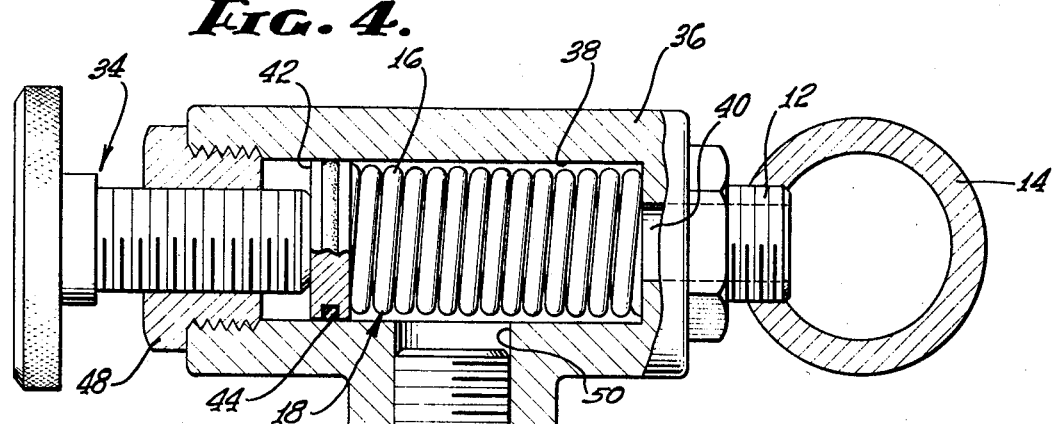
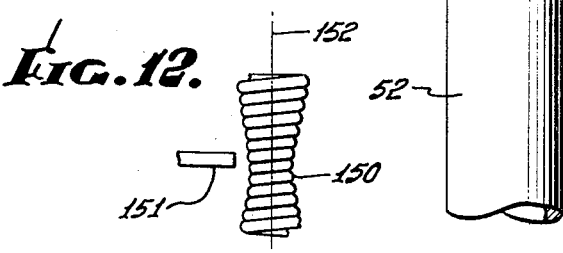
JAMES W. WELSH
JAMES F. DAVIS, JR.
INVENTOR.
BY White & Haefliger
ATTORNEYS.

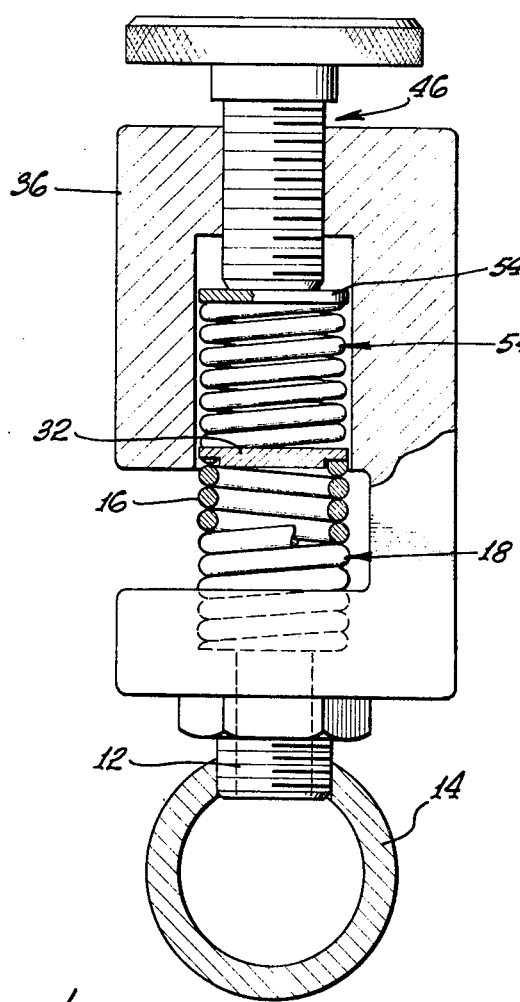
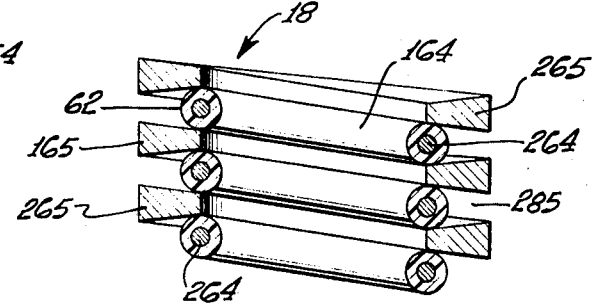
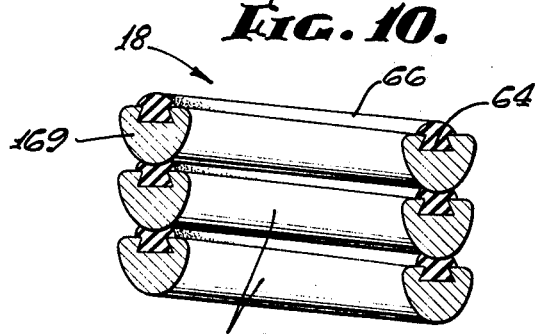
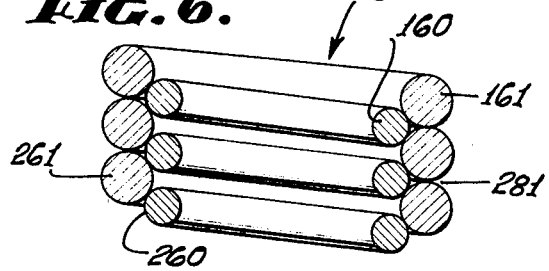
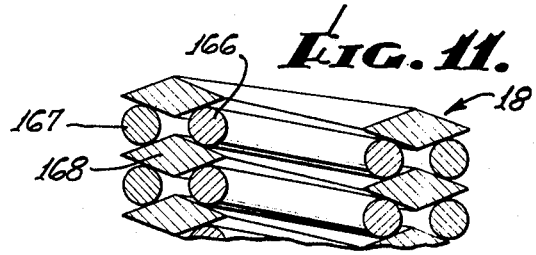
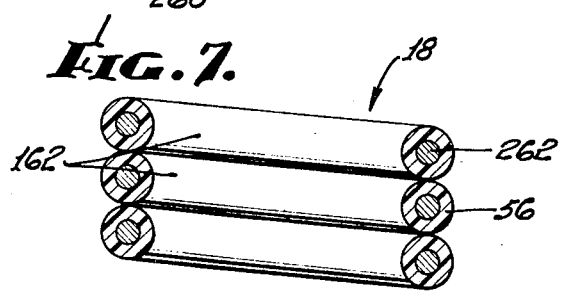

James W. Welsh, 1642 Mockingbird Place, Orange, Calif. 92667, and James F. Davis, Jr., 11002 Fuerte Drive, La Mesa, Calif. 92041
Filed July 6, 1967, Ser. No. 651,504
Int. Cl. F16k 15/14, 17/02
U.S. Cl. 137—525     8 Claims

ABSTRACT OF THE DISCLOSURE

A device for control of fluid flow which in combination with a fluid passing duct includes a helically extending element, such as a coil spring, defining a generally tubular body the interior of which is in communication with the duct. The element has helical turn extents which are relatively bodily separable to vary the spacing therebetween, and accordingly fluid flow, through the spacing between the interior and exterior of the body.

BACKGROUND OF THE INVENTION

Field of the invention

This invention has to do with fluid flow control devices including flow regulators and valves and particularly such devices having a variable fluid passing orifice controllable by application of pressure to the device. Connected in communication with a fluid passing duct such as a pipe or conduit, the present devices control fluid flow to, through or out of such ducts. Advantageously, by employing an element having plural adjacent turn extents, which are bodily separable to vary their spacing, the devices of this invention provide a great orifice variation relative to size change of the device. Moreover, the timing and extent of orifice variation in the present devices can be closely controlled and over a rather wide range by relatively simple means including self-controlling means and resilient biasing devices.

Prior art

Many fluid flow controlling devices are known, but to our knowledge none having the structure or functional features of the presently disclosed device which utilizes controlled opening and closing of a helical element to regulate fluid flow and/or pressure.

SUMMARY OF THE INVENTION

The present invention provides a device for controlling fluid flow including a fluid passing duct and a helically extending element defining a generally tubular body the interior of which is in communication with the duct, the element having helical turn extents which are relatively bodily separable to vary the spacing therebetween through which fluid is flowable between the interior and exterior of the body. The element may be pressure responsive through the inclusion of means plugging the interior of the element to receive pressure of fluid within the interior and to transmit force to the element tending to stretch the element and thereby increase the spacing between adjacent turn elements. Typically and preferably, the element is a coil spring of the tension or compression type and is associated with internal or external spring means tending to bias the element toward some desired space relation of the element turn extents. A housing may be provided for enclosing the device to include a passage into which the element is received, control means, such as a spring mounted in the housing to act on the element and port means through the housing from the element receiving passage.

The helically extending element of the present device may have various resiliency characteristics built thereinto including a tension characteristic to be resiliently resistive to axial elongation by fluid pressure within the tubular body, or a compression characteristic to be resiliently resistive to axial compression. In either case, the spring element may be conveniently combined with a second spring element which acting endwise biases the element against its resistive force and the force of fluid pressure within the tubular body, thus to control spacing of the adjacent turns of the spring.

The spring elements further may be biased one way or another by nested combination with other springs of similar or dissimilar characteristics. Thus multiple coaxially alined compression springs, one disposed within another and having relative proportions tending to reduce the inner spring to less than normal length and diameter and simultaneously tending to increase the outer spring to greater than normal length and diameter may be employed for achieving high sensitivity to pressure increments and excellent control over orifice opening by virtue of the inner spring tending to expand radially on axial elongation of the outer spring into the helical orifice formed between the element turns to partially close that orifice to fluid flow and to provide a scrapping action adapted to accurate controlling of flow of viscous or sedimentitious fluids.

The element may be a coil in helical form and having any of numerous cross-sectional configurations, e.g., curvilinear or polygonal conveniently congruent with or at least complementary to laterally adjacent elements, if any.

The present devices may be utilized in fluid flow systems which include conduit for passing fluid under pressure from place to place and in open communication with the device tubular body. Specific devices may be adapted to open only in response to greater than a predetermined minimum pressure in the system and thus to function as a pressure relief valve.

BRIEF DESCRIPTION OF THE DRAWINGS

FIG. 1 is a front elevation of a fluid flow system section showing a flow control device of the present invention in use position;

FIG. 2 is a greatly enlarged view, partly in section taken along line 2—2 in FIG. 1;

FIG. 3 is a view similar to FIG. 2 but showing the device in open or fluid passing condition;

FIG. 4 is a sectional view of an adjustable fluid system flow regulator according to the invention;

FIG. 5 is an elevation, partly in section of an alternate form of the present device;

FIGS. 6–11 are fragmentary sectional views of various element configurations and arrangements; and FIG. 12 illustrates emergency opening of a spring.

Referring now to the drawings, in detail, in FIG. 1 there is shown a device 10 for controlling fluid flow mounted on a fluid passing duct 12 leading from fluid flow system conduit 14. The device 10 is seen to comprise (FIG. 2) a support 15, having a stepped bore 15a, secured to the duct 12, a helically extending element 16 secured in the upper portion of the bore 15a and defining a generally tubular body 18 the interior 20 of which is in communication with the interior 22 of the duct 12 and through the duct with interior 24 of conduit 14. The element 16 has plural helical turn extents 26 which as clearly shown in FIG. 3 are bodily separable to vary the spacing 28 therebetween through which fluid (indicated by arrows in FIG. 3) is flowable between the interior 20 of the body 18 and the exterior thereof generally indicated at 30.

The end of body 18 opposite the duct 12 is plugged by fluid impermeable plug 32 sealably seated with flanged 32a on the uppermost turn extent 26 of the helical element 16. Plug 32 is securely fastened to the tubular body 18 so as to receive the pressure of fluid within the interior 20 of the body and to transmit the force resulting to the element 16 thereby tending to stretch the element and increase the spacing 28 between adjacent turn extents 26.

Thus the presence of fluid pressure within the tubular body communicated from the conduit 14 acts to lift the plug 32 and the plug movement opens, "cracks," the element 16 between adjacent turns 26 opening a helically extending orifice in the spacing 28 very long relative to the increase in longitudinal axial extent of the tubular body 18. This form of the device is well adapted to act as a relief or "safety" valve by forming the body 18 of a tension spring tending to remain closed so that axial upward movement of the plug 32 is resiliently resisted by the spring coils and only pressure above some predetermined threshold value will "crack" the spring element and relieve interior pressures.

The just described pressure regulating device is capable of reseating at a pressure relatively close to its "cracking" pressure which permits a "weeping" action since very slight separation of the element turn extents provides a relatively large linear opening. The velocity of escaping fluid thus remains relatively lower than is the case for example in poppet-type valve devices.

In addition to self-controlling valves, devices of the present invention may be used in conjunction with force transmitting members which are adapted to vary the fluid passing condition of the device. Thus with reference to FIGS. 4 and 5 force transmitting elements in the form of adjusting screw 34 (FIG. 4) or compression spring 54 (FIG. 5) are alined to exert axial force on the helical element 16 altering the unrestrained condition of the element either fixedly as in FIG. 4 or resiliently as in FIG. 5.

To provide support for the force transmitting members and the flow controlling device in appropriate alinement, these components are conveniently mounted within a housing into and out of which fluid passes. Thus, with reference to FIG. 4 housing 36 is shown to include a passage 38 into which the helical spring element 16 is received. Fluid inlet 40 in the housing 36 leads from conduit 14 through duct 12 and with them defines a fluid path to the housing passage 38 terminating at the open end of the tubular body 18 formed by spring element 16. At the end of the body 18 opposite the fluid inlet a disc 42 provided with peripheral O-ring seal 44 is slidably positioned within the passage 38. Adjusting screw 34 rotatable in screw block 48 of the housing 36 bears on the sealing disc 42 and through the disc on spring element 16 thereby determining the longitudinal axial extension of the tubular body 18. Laterally of the body 18 a port 50 into the housing passage 38 is provided so that the tubular body 18 controls communication between conduit 14 and pipe 52 leading from the port 50. The spring element 16 in the arrangement depicted in FIG. 4 is typically and preferably a compression spring, i.e., a spring tending to elongate and, if restrained, exerting an outward axial force. By appropriate location of the sealing disc 42, or by rotation of adjusting screw 34, the permissible elongation of spring element 16 and thus the axial extension of tubular body 18 is controllable. The increase in axial extent, of course, increases the spacing 28 between turn extents 26 and thus the flow passing orifice defined by the device. Accordingly, by adjustment of screw 34 fluid communication between conduit 14 and pipe 52 is controlled.

FIG. 5 is similar in typically and preferably employing a compression spring element 16 but differs in providing a pressure responsive controller operable to control the opening of spacing 28 to create the fluid passing orifice. The controller as shown is a compression spring 54 extending coaxially and endwise of the spring element 16, but at the opposite side of plug 32. The assembly provides resilient resistance to expansion of the tubular body 18, defined by elongation of the spring element 16. Force exerted on the spring element 16 by load compression spring 54 may be relatively statically varied by adjustment of adjusting screw 46 acting on plate 54a. Note that spring 54 is confined between plug 32 and plate 54a. Use of opposing compression springs as shown has been found to be smooth and essentially instantaneous in its response to internal fluid pressure changes and to be without significant inertial resistances. In the devices of FIGS. 4 and 5, as with the device of FIGS. 1, 2 and 3, the velocity of escaping fluid is relatively lower than is possible with conventional lift-off valves occupying similar volumetric envelopes. The effective length of the orifice can be increased or decreased by varying the number of turn extents permitted to move under the influence of the contained fluid pressure and/or external force applied in opposition to the fluid pressure. Variation in spring rate through the length of the orifice, e.g., by varying spring element diameter, may be employed to reduce the tendency to cyclic surging on the closing of the device.

In operation the devices of FIGS. 4 and 5 are used as fluid flow regulators. The flow rate is fixed by adjustment of the screw 34 in FIG. 4 with retractive movement widening the spacing 28 and inward movement narrowing the spacing 28, thereby to control fluid flow through the device. The FIG. 5 device is variably pressure responsive by virtue of provision of the spring element 54. After an initial adjustment with screw 46 in housing 36, the spring element 16 opens in response to pressure within the interior thereof exerted on plug 32 as in FIGS. 2 and 3 such opening being opposed by the load bearing on the plug 32 in the form of compression spring 36.

Opening and closing characteristics may be widely varied by nesting or interfitting two or more helical spring elements to form the tubular body. The pitch diameters, wire shape and size, and coil pitch will be selected so that the inner compression spring element is constrained by the outer spring element to take a compressed, shorter than normal disposition and the outer spring element is correspondingly stretched, lengthened to take a larger than normal disposition by the resistance of the inner spring element. In this arrangement the inner spring element is radially constrained toward a reduced pitch diameter by the outer spring element which in turn is subjected to the radial expansion of the inner spring element. This condition of dual preload, the inner spring striving to expand and lengthen the outer spring and the outer spring striving to compress and shorten the inner spring, results in large closure forces between the alternate coils of the inner and outer springs which is substantially independent of the fluid pressure exerted on either the inside or the outside of the two nested spring elements. When pressure changes within the tubular body, the interaction of the nested spring elements exerts a high static friction force which resists displacement in either direction parallel to pitch axis. In addition, the start of linear displacement by stretching does not result immediately in a fluid flow-permitting increase in the spacing between successive turn extents because the alternate turn extents of the inner spring element enter the outer spring spacing. Thus opening or "cracking" occurs between the inner and outer turn extents and at or near the condition where the outer spring is stretched enough to permit the inner spring to expand radially to its normal or neutral pitch diameter. There is, in this opening action, a wiping of the opposing faces of the fluid passing orifice as the turn extends move laterally past one another. This action is of value in fluid flow systems where sediment contaminated or slurry fluids are under pressure since the device thereby offers high resistance to leakage by virtue of the lodging or embedding of particular matter about the valve-acting surfaces.

FIG. 6 illustrates the nested relation between different pitch diameter spring elements providing the just-described opening, closing and wiping action. Outer spring element 161 and inner spring element 160 are combined to define a tubular body 18. Inner spring element 161 is radially constrained and outer spring element 160 is radially stretched by virtue of the nested arrangement. Axial expansion of the outer spring element 161, effected as described above, opens spacing 281 to permit movement of inner spring element turn extents 260 between the outer spring element turn extents 261 with a sliding or wiping movement.

The helical elements of the present devices may be formed of suitable materials with regard to degree of resiliency, if any, desired, chemical or temperature resistance required and cost. Synthetic organic plastic materials such as nylon and polypropylene as well as drawable metals or combinations of these may be used. Ordinary spring steel is a preferred material. The turn extents may have various cross-sectional configurations including curvilinear, i.e., oval, round, U-shapes and the like or polygonal, i.e., square, rectangular, diamond, triangular, trapezoidal and the like. In nested spring element arrangements, different configurations for the inner and outer turn extents enables wide selection of mating relations.

In FIGS. 6 through 11 several turn extent configurations are illustrated. FIG. 6 shows two round section springs of different gauge wire nested, the smaller gauge springs element 160 within the larger gauge spring element 161. In FIG. 7 a single spring element 162 is shown comprising spring steel turn extents 262 with a wire coating type layer of plastic 56. This combination provides the resilient response of spring steel and the chemical resistance of plastic in a single spring element. FIG. 8 depicts a rectangular section spring element 163 the mating surfaces of which provide a relatively wide seal line 58. FIG. 9 shows a combination of nested spring elements in the manner of FIG. 7 in which the inner spring element 164 is of round cross section and comprises wire steel turn extents 264 and a coating of plastic 62, and in which the outer spring element 165 is of trapezoidal cross section. This arrangement offers a varying resistance to outward expansion of the inner spring element 164 on axial elongation of outer spring element 165 as the inner turn extents 264 encounter a decreasing spacing 285 across the width of the outer spring turn extents 265 at any given elongation of the outer spring element 165. FIG. 11 is similar, but includes a pair of round section spring elements 166 and 167 which are nested with a third diamond section spring element 168 interposed therebetween. This arrangement illustrates that many different combinations of various shaped spring elements can be devised to achieve particular effects.

FIG. 10 includes a U-shaped section single spring element 169 having a helical upward opening slot 64 in which is secured a sealing material 66 such as rubber to improve leakage resistance characteristics between adjacent turn extents 269, when the device is closed.

In FIG. 12 there is illustrated a tapered spring 150 configuration which may be utilized for the springs in the devices of FIGS. 2-5. Operator 151 is provided to apply relatively small force in a direction normal to the spring axis 152 to sidewardly deflect the spring. Such deflection provides a relatively large orifice length between the deflected spring turns, to exhaust fluid under special or emergency situations.

In summary, a device for controlling fluid flow has been described utilizing the properties of helical elements such as coil springs of the compression or tension type, alone or in combination to control fluid flow and/or pressure.

We claim:

1. In a device for controlling fluid flow, a fluid passing duct, first and second helically extended elements in nested relation defining a generally tubular body the interior of which is in communication with said duct, said first and second elements having respectively outer and inner helical turn extents which are interfitting and relatively bodily separable to vary the spacing between said inner and outer turn extents through which fluid is flowable between the interior and exterior of the body.

2. Device according to claim 1 in which each of said elements defines a coil spring.

3. Device according to claim 2 in which said outer element is a compression spring resiliently resistive to axial compression and in which said second element operates to compress said compression spring against its resistive force and the force of fluid pressure within said body to limit spacing of successive turns of said compression spring.

4. Device according to claim 2 in which said elements comprise coaxially alined compression springs one within another and having relative proportions tending to reduce the inner spring to less than normal length and diameter and simultaneously tending to increase the outer spring to greater than normal length and diameter, said inner spring tending to expand radially on axial elongation of said outer spring, such relative movement of said springs providing a separation of the spring turns helically of the spring axes.

5. Device according to claim 4 in which said multiple springs comprise elongated elements having surfaces providing an interfitting relation.

6. Device according to claim 5 in which the turns of said springs are circular in cross section.

7. Device according to claim 5 in which the turns of one of said springs are polygonal in cross section and the turns of the outer of said springs are circular in cross section.

8. Device according to claim 5 in which said device includes two circular cross section springs on nested on opposite sides of a third spring of diamond cross section.

References Cited

UNITED STATES PATENTS

| | | |
|---|---|---|
| 935,541 | 9/1909 | Owers. |
| 1,165,637 | 12/1915 | Thomas. |
| 2,363,279 | 11/1944 | Anschicks. |
| 2,369,005 | 2/1945 | Anschicks. |
| 3,151,628 | 10/1964 | Heckert. |
| 3,399,699 | 9/1968 | Greene _____ 137—637 |

WILLIAM F. O'DEA, Primary Examiner

W. H. WRIGHT, Assistant Examiner

U.S. Cl. X.R.

137—637